(12) United States Patent
Kim (10) Patent No.: US 7,474,500 B2
(45) Date of Patent: Jan. 6, 2009

(54) HARD DISK HAVING AIR GUIDE

(75) Inventor: Myung-il Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 584 days.

(21) Appl. No.: 10/939,413

(22) Filed: Sep. 14, 2004

(65) Prior Publication Data

US 2005/0094313 A1 May 5, 2005

(30) Foreign Application Priority Data

Nov. 5, 2003 (KR) .................. 10-2003-0078103

(51) Int. Cl.
*G11B 33/14* (2006.01)
(52) U.S. Cl. .................. 360/97.02; 360/97.01
(58) Field of Classification Search .......... 360/97.02, 360/97.01; 720/648
See application file for complete search history.

(56) References Cited

U.S. PATENT DOCUMENTS

| | | | | |
|---|---|---|---|---|
| 6,266,208 | B1 * | 7/2001 | Voights | 360/97.02 |
| 7,139,154 | B2 * | 11/2006 | Iwahara et al. | 360/245.9 |
| 2002/0135933 | A1 * | 9/2002 | Harrison et al. | 360/97.02 |
| 2002/0163755 | A1 * | 11/2002 | Gillis et al. | 360/97.02 |
| 2003/0099060 | A1 * | 5/2003 | Kang et al. | 360/97.02 |
| 2003/0151848 | A1 * | 8/2003 | Lee | 360/97.02 |
| 2003/0156350 | A1 * | 8/2003 | Hong et al. | 360/97.02 |
| 2003/0156352 | A1 * | 8/2003 | Voights et al. | 360/97.02 |
| 2003/0197974 | A1 * | 10/2003 | Hong et al. | 360/97.02 |
| 2003/0231424 | A1 * | 12/2003 | Hong et al. | 360/97.02 |

FOREIGN PATENT DOCUMENTS

| | | |
|---|---|---|
| JP | 04-358389 | 12/1992 |
| JP | 5-41077 | 2/1993 |
| JP | 2001-338482 | 12/2001 |
| JP | 2003-085941 | 3/2003 |
| KR | 2000-0032705 | 6/2000 |
| WO | WO 03021596 A1 | 3/2003 |

OTHER PUBLICATIONS

WO 03/021596 A1 corresponds to JP 2003-085941.

* cited by examiner

*Primary Examiner*—Tianjie Chen
(74) *Attorney, Agent, or Firm*—Staas & Halsey LLP (57) ABSTRACT

A hard disk drive includes a housing including a base member and a cover member; a spindle motor installed on the base member; at least one disk for data storage mounted on the spindle motor; an actuator rotatably installed on the base member, the actuator having a read/write head for recording data on the disk or reproducing the recorded data; and an air guide placed on the bottom of the cover member, protruding toward the disk near the head, and dispersing an air flow caused by the rotation of the disk and directed toward the head. The air guide has a triangular shape with an apex directed against the air flow to split and direct the air flow toward the spindle motor and the disk such that the air guide alleviates the impact of the air flow on the head and reduces reducing the head's vibration.

16 Claims, 6 Drawing Sheets

HARD DISK HAVING AIR GUIDE

CROSS-REFERENCE TO RELATED APPLICATION

This application claims the benefit of Korean Patent Application No. 2003-78103, filed on Nov. 5, 2003 in the Korean Intellectual Property Office, the disclosure of which is incorporated herein in its entirety by reference.

BACKGROUND OF THE INVENTION

1. Field of the Invention

The present invention relates to a hard disk drive and, more particularly, to a hard disk drive for controlling the flow of air to thereby reduce the head's vibration and accordingly to enhance the performance of head in read/write.

2. Description of the Related Art

A hard disk drive (HDD) is a data storage device of a computer and records or reproduces data stored on a disk using a read/write head. In the HDD, a head performs the recording or reproducing function while being lifted from the recording surface of a rotating disk by a predetermined height and moved to a desired location by an actuator.

Figure 1:
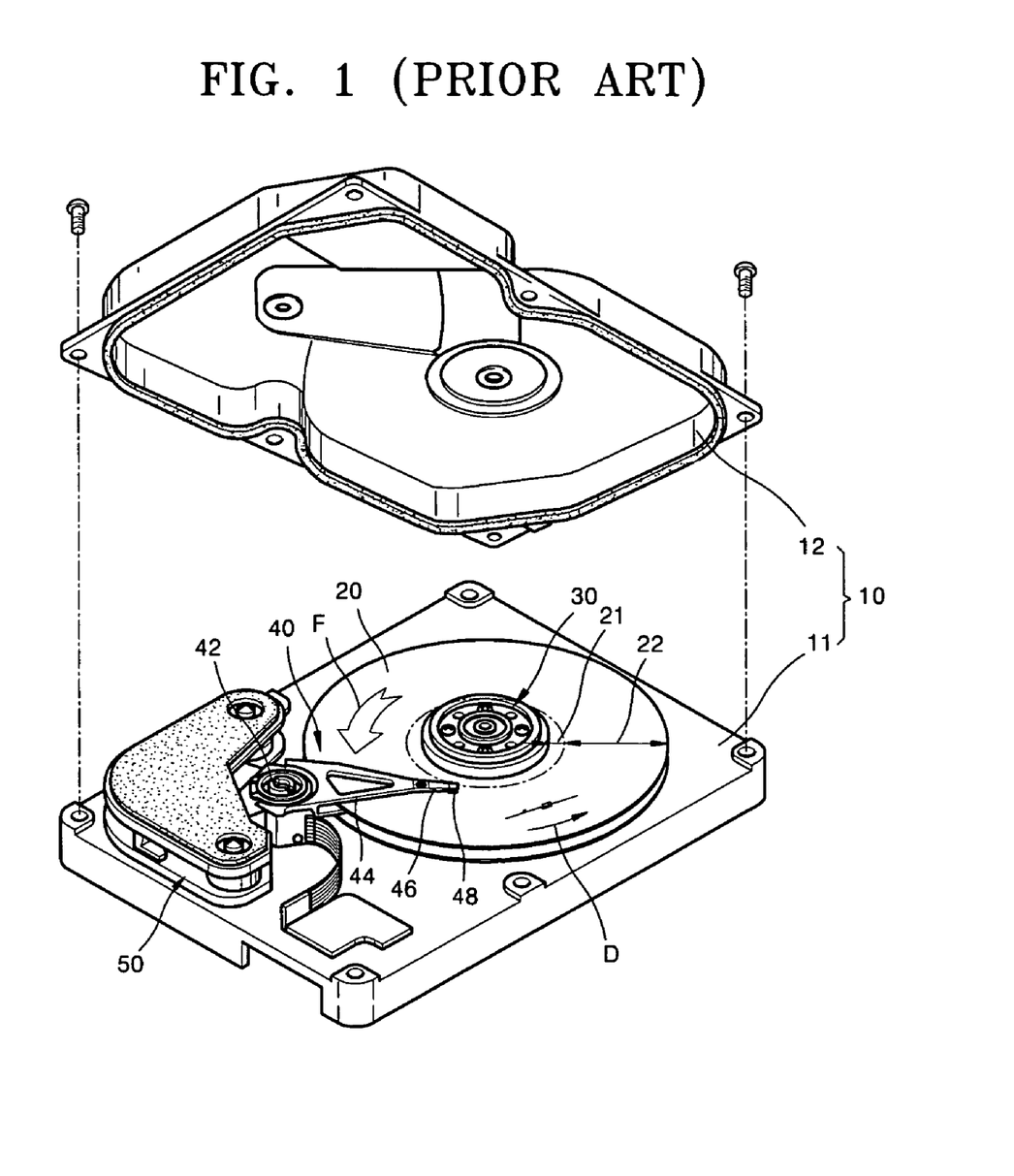
FIG. 1 is a schematic perspective view of one example of a conventional hard disk drive.
Figure 2:
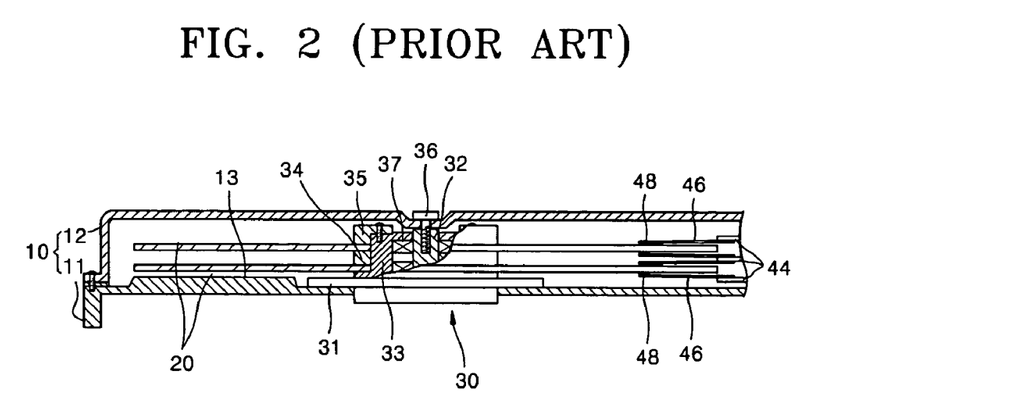
FIG. 2 is a vertical longitudinal sectional view of the hard disk drive depicted in FIG. 1.

FIG. 1 is a schematic perspective view of one example of a conventional HDD. FIG. 2 is a longitudinal vertical section of the HDD shown in FIG. 1. Referring to FIGS. 1 and 2, the HDD is equipped with a housing 10 consisting of a base member 11 and a cover member 12A; a spindle motor 30 is provided on the base member 11. At least one disk 20 is fixedly installed on the spindle motor 30. An actuator 40 is included for moving a read/write head (not shown) for data recording/reproducing to a predetermined location on the disk 20.

The spindle motor 30 is supported by a flange 31 fixedly installed on the base member 11. A shaft 32 of the spindle motor 30 is fixed to the cover member 12 to which the top end of the shaft is usually coupled by a screw 36. A bearing 37 is installed between the shaft 32 and a hub 33 to which the disk 20 is fitted. When a plurality of disks 20 are mounted, a ring-shaped spacer 34 for maintaining the distance between the disks 20 is placed on the hub 33. A clamp 35 for clamping the disks 20 is coupled to the top end of the hub 33.

The actuator 40 includes a swing arm 44 rotatably coupled to a pivot bearing 42 installed on the base member 11, a suspension 46 provided on one end of the swing arm 44 for elastic-biasing the slider 48 toward the surface of the disk 20, and a voice coil motor (VCM) 50.

When the HDD is turned on and the disk 20 starts to rotate in the direction of an arrow D, the VCM 50 causes the swing arm 44 to rotate to move the slider 48 above the recording surface of the disk 20. The slider 48 is lifted from the surface of the disk 20 by a predetermined height due to a lifting force produced by the rotating disk 20. In this condition, the head mounted on the slider 48 writes data on or reads data from the disk 20.

When the HDD does not work or the disk 20 stops rotating, the head is prevented from colliding with the disk 20 by being landed on a location apart from the recording surface of the disk 20. For this purpose, a parking zone 21, where the slider 48 parks when the power is OFF, is provided in an inner circumferential side of the disk 20, and a data zone 22, where data is written, is provided in an outer circumferential side of the disk 20.

Recently, the data storage capacity and rotation speed of HDDs have considerably increased. The data storage capacity of a HDD is proportional to a surface recoding density, which is determined by the product of a linear recording density indicated as BPI (bits per inch) and the track density indicated as TPI (tracks per inch). Whereas BPI has been increased based on newly developed magnetic recording technology, TPI has been generally increased by enhancing the mechanical dynamic characteristics of the HDD.

In the conventional HDD shown in FIG. 2, the distance between the lower disk 20 and the base member 11 and the distance between two disks 20 are sufficiently narrow, but the distance between the upper disk 20 and the cover member 12 is comparatively wide. Generally, an elevated plane 13 protruding toward the disk 20 is formed on the base member 11, to render the distance between the disk 20 and the base member 11 narrower. Therefore, between the base member 11 and the lower disk 20 and two disks 20, an almost laminar air flow is caused by the rotation of the disks 20, and the amount of air supplied to the suspension 46 and the slider 48 of the actuator 40 is relatively small, thereby reducing the impact of the air flow on the slider 48.

However, because the distance between the upper disk 20 and the cover member 12 is relatively wide, the air flow caused by the rotation of the disk 20 becomes turbulent and the amount of flowing air is relatively large. This aggravates the impact of the air flow on the suspension 46 and the slider 48 of the actuator 40. Accordingly, the head mounted on the slider 48 starts to vibrate, thereby decreasing the servo control tracking accuracy and deteriorating the read/write performance of the head.

To solve this problem, Japanese Patent Application Laid-open Publication No. 2001-338482 discloses an HDD having a thin plate attached to the bottom of a cover member to reduce a distance between the plate and a disk in order to repress disk fluttering. Such a structure only reduces disk fluttering but does not prevent the air flow from hitting the head. To this end, the publication proposes a barrier placed outside the disk, which, however, acts to control the air flow toward the head from the actuator but does not block the air flow formed between the disk and the cover member.

SUMMARY OF THE INVENTION

Additional aspects and/or advantages of the invention will be set forth in part in the description which follows and, in part, will be obvious from the description, or may be learned by practice of the invention.

An aspect of the present invention provides a hard disk drive having an air guide for controlling the air flow between a cover member and a disk to thereby reduce head vibration so that a head can perform accurate tracking and thus improved read/write functions.

According to an aspect of the present invention, there is provided a hard disk drive comprising: a housing including a base member and a cover member; a spindle motor installed on the base member; at least one disk for data storage mounted on the spindle motor; an actuator rotatably installed on the base member, the actuator having a read/write head for recording data on the disk or reproducing the recorded data; and an air guide placed on the bottom of the cover member, protruding toward the disk near the head, and dispersing an air flow caused by the rotation of the disk toward the read/write head.

According to an aspect of the invention, the air guide has a triangular shape with an apex directed against the air flow to split and direct the air flow toward the spindle motor and the disk.

According to aspects of the invention, the air guide is attached to the bottom of the base member as a separate member and/or, the air guide is formed integrally with the cover member.

According to an aspect of the invention, the distance between the air guide and the disk desirably is in a range of 0.3 mm and 0.5 mm.

The air guide according to an aspect of the present invention disperses the air flow directed toward the head of the actuator, thereby alleviating air impact on the head and reducing head's vibration and improving the accuracy of the head's tracking performed according to a servo control such that the head's read/write functions are properly performed.

BRIEF DESCRIPTION OF THE DRAWINGS

The above and/or other features and advantages of the present invention will become more apparent and more readily appreciated by describing in detail exemplary embodiments thereof with reference to the attached drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
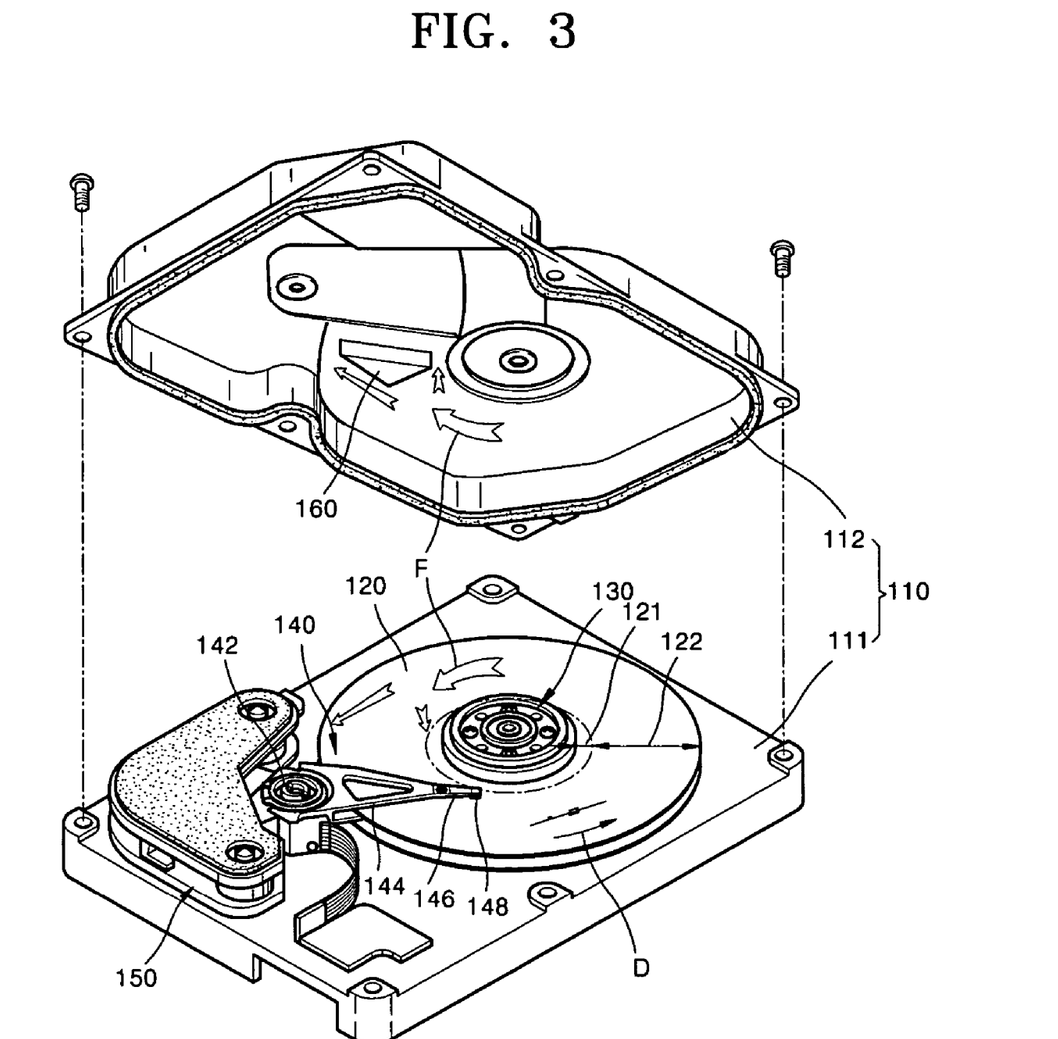
FIG. 3 is a perspective view of one embodiment of a hard disk drive of the present invention.
Figure 4A:
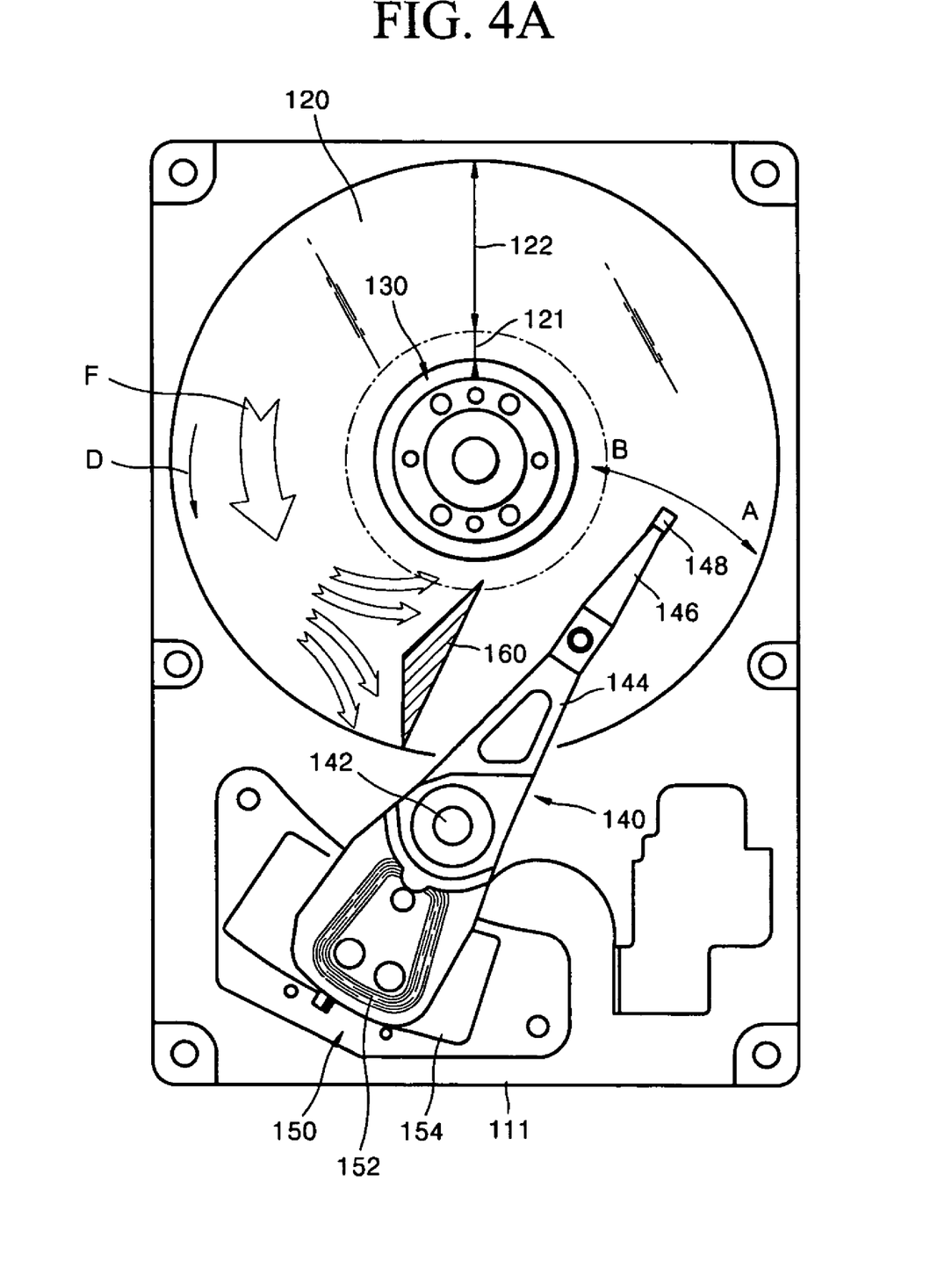
FIG. 4A is a plan view of an embodiment of a base member of the hard disk drive shown in FIG. 3 showing the location of an air guide and an air flow dispersed thereby.
Figure 5:
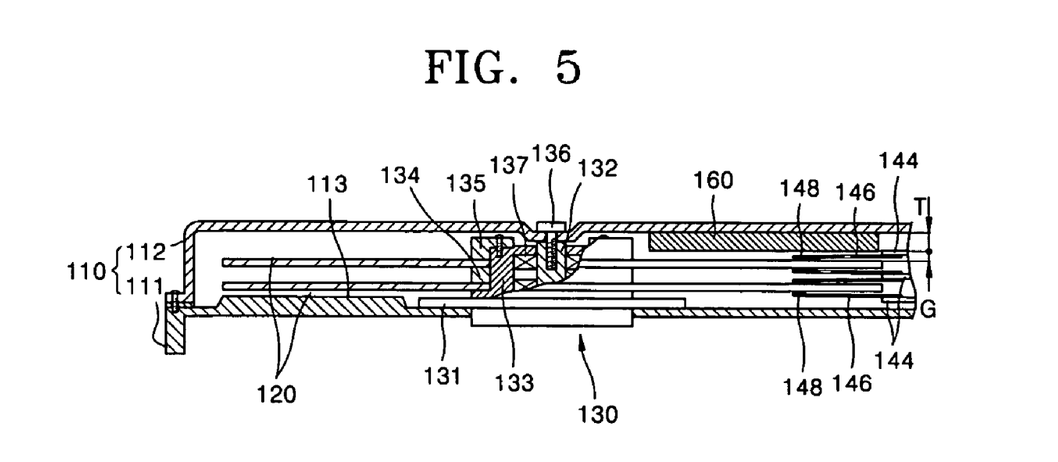
FIG. 5 is a vertical longitudinal sectional view of the hard disk drive depicted in FIG. 3.

Referring to FIGS. 3 through 5, a hard disk drive according to an embodiment of the present invention includes a housing 110 including a base member 111 and a cover member 112, a spindle motor 130 installed inside the housing 110, a disk 20 for storing data, an actuator 140 having a read/write head, and an air guide 160 formed on a bottom of the cover member 112.

The housing 110 is installed in the main body of a computer, by way of example. However, it is understood that the housing 110 could be otherwise in communication with the computer, or could be part of a device, such as a Digital Video Recorder or multimedia recording and/or reproducing device such as an MP3 Player. The base member 111 is for supporting the spindle motor 130 and the actuator 140, and the cover member 112 fitted to the top of the base member 111 is for protecting the disk 120. The housing 110 is usually made of stainless steel or aluminium. An elevated plane 113 having a predetermined height in the direction of the disk 120 is formed on the top of the base member 111. The elevated plane 113 reduces the distance between the disk 120 and the base member 111, thereby reducing vibrations of the disk 120.

The disk 120 is a medium for data recording and/or reproducing. In the inner circumferential side of the disk 120, a parking zone 121 where the head is parked when the hard disk drive stops operating is provided. A data zone 122 where data is written is provided in an outer circumferential side area of the disk 120.

The spindle motor 130 rotates the disk 120 while being supported by a flange 131 fixedly installed on the base member 111. A shaft 132 of the spindle motor 130 is fixed to the cover member 112 by a screw 136. At least one disk 120 is fixedly fitted on a hub 133 of the spindle motor 130. A bearing 137 is installed between the shaft 132 and the hub 133. When a plurality of disks 120 are mounted on the spindle motor 130, a ring-shaped spacer 132 is interposed between the disks 120 to maintain a distance therebetween constant, and a clamp 135 is coupled to the top end of the spindle motor 130 to clamp the disks 120.

The read/write head is moved by the actuator 140 to a predetermined location above the disk 120 to record or reproduce data written on the disk 120. The actuator 140 is rotatably provided on the base member 111. Specifically, the actuator 140 includes a swing arm 144 rotatably coupled to a pivot bearing 142 installed on the base member 111, a suspension 146 placed on one end of the swing arm 144 to elastically support a slider 148 toward the surface of the disk 120, and a VCM 150. The read/write head is located on the slider 148. The VCM 150 has a VCM coil 152 coupled to the other end of the swing arm 144, and a magnet 154 facing the VCM coil 152.

The VCM 150 is controlled by a servo control system (Not Shown), and rotates the swing arm 144 in a direction in accordance with Fleming's left hand rule, due to the interaction between the current input to the VCM coil 152 and a magnetic field formed by the magnet 154. In more detail, when the hard disk drive is turned on and the disk 120 starts to rotate in the direction of an arrow D, the VCM 150 rotates the swing arm 144 clockwise (in the direction of arrow A) so that the slider 148 with the write/read head is moved to the data zone 122 from the parking zone 121 of the disk 120. The slider 148 is lifted by a predetermined height from the surface of the disk 120 by a lifting force produced by the rotating disk 120. In this state the head mounted on the slider 148 performs recording data on or reproducing data from the recording surface of the disk. Conversely, when the hard disk drive does not work or when the rotation of the disk 120 stops, the VCM 150 causes the swing arm 144 to rotate counter clockwise (in the direction of an arrow B) so that the slider 148 with the head lands on the parking zone 121 of the disk 120.

Generally, a head parking system, uses a ramp loading method and a contact start stop (CSS) method as explained above. In the ramp loading method, a ramp (Not Shown) is placed outside the disk 120 instead of the parking zone 121 usually provided in an inner circumferential side of the disk 120 so that a comparatively wide data storage space is guaranteed. The head rests on the ramp. The embodiment of the present invention may be applied to a hard disk drive employing a head parking system using the ramp loading method as well as the CSS method.

As an aspect of the present invention, the air guide 160, formed on the bottom of the cover member 112, is located in front of the slider 148 having the read/write head, near the write/read head and with a narrowing edge facing in the direction of air flow F caused by the rotation of the disk 120. The air guide 160 may be attached to the bottom of the cover member 112 by means of an adhesive or other attaching elements such that it protrudes toward the disk 120 by a predetermined height. However it is understood that the air guide 160 can be otherwise disposed and/or connected.

Figure 4B:
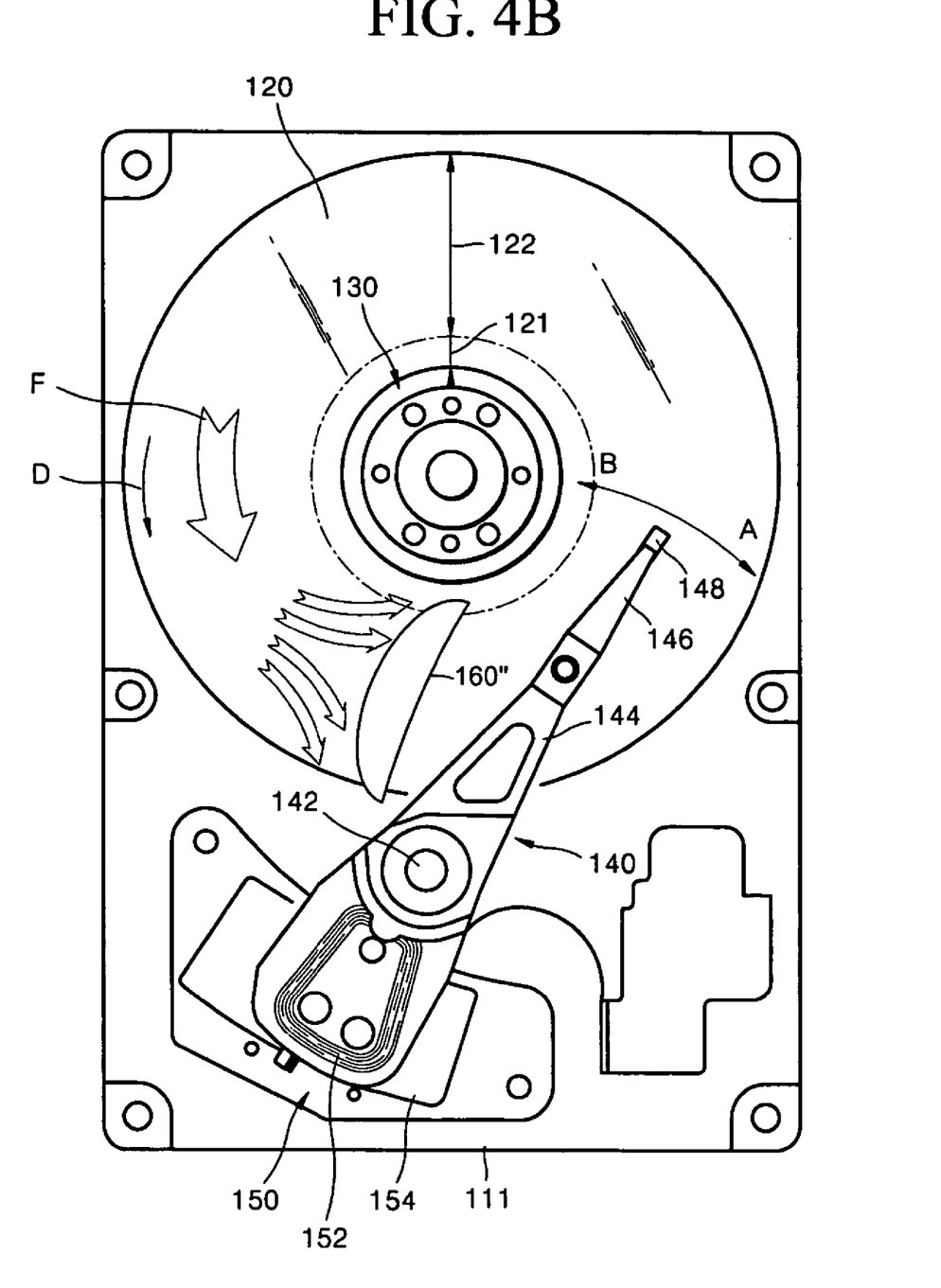
FIG. 4B is a plan view of an embodiment of a base member of hard disk drive shown in FIG. 3 showing another example of the an air guide and an air flow dispensed thereby.

The air flow F caused by the rotation of the disk 120 toward the head is dispersed by the air guide 160. To this end, the air guide 160 may have a triangular shape with an apex directed against the air flow F as shown in FIG. 4A. The air flow F directed toward the slider 148 having the head is split by the air guide 160 and directed toward the spindle motor 130 and the outer circumference of the disk 120. And also the air guide 160 may have a semicircular shape 160" as shown in FIG. 4B, or any other aerodynamic shape which separates the airflow F.

A thickness T of the air guide 160 is in a predetermined range so that the distance G between the bottom of the air guide 160 and the disk 120 approximately ranges from 0.3 mm to 0.5 mm. If the air guide 160 is thick enough so that the distance G between the air guide 160 and the disk 120 is smaller than 0.3 mm, then it is more likely that the air guide 160 interferes with the disk 120 during the assembly of the hard disk drive. Conversely, if the air guide 160 is thin enough so that the distance G between the air guide 160 and the disk 120 is larger than 0.5 mm, a larger amount of air flows toward the head through the gap G between the air guide 160 and the disk 120, thereby degrading the air dispersion effect of the air guide 160.

As described above, due to the air guide 160 placed in front of the slider 148, the air flow F directed toward the read/write head is dispersed so that the amount of air reaching the read/write head is reduced. Thus, the impact of air on the read/write head is alleviated so that vibration of the read/write head is reduced as well, thereby making it easier to perform servo control with respect to head's tracking and improving the tracking accuracy, thereby enhancing the read/write functions of the head.

Figure 6:
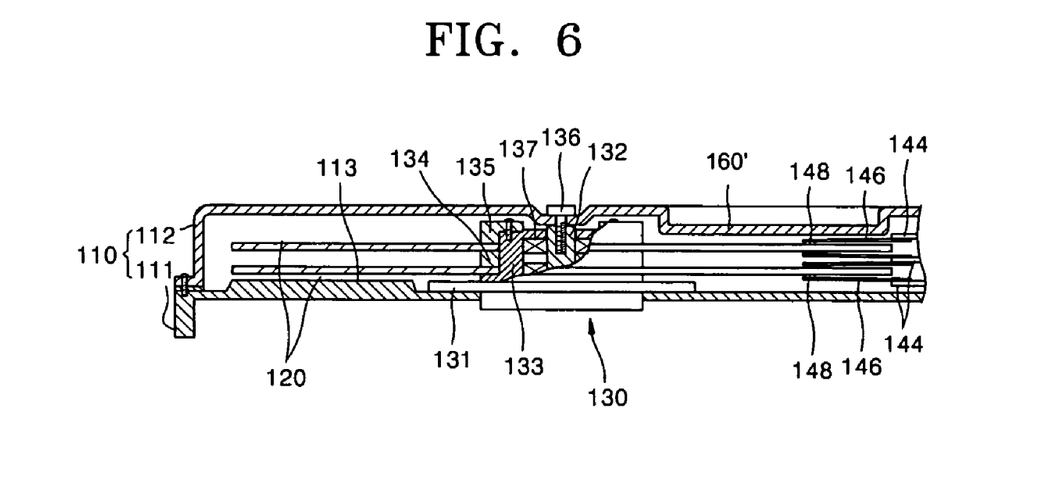
FIG. 6 is a vertical longitudinal sectional view of the hard disk drive of FIG. 5 showing an air guide according to another embodiment of the present invention.

FIG. 6 is a vertical longitudinal sectional view of the hard disk drive of FIG. 5 showing an air guide according to another embodiment of the present invention. As shown in FIG. 6, an air guide 160' is formed integrally with the cover member 112. For instance, when the cover member 112 is made of aluminum using a die cast method, the air guide 160' may be formed along with the cover member 112 during the die-casting process according to an aspect of the invention. When the cover member 112 is made of a stainless steel sheet using pressing, the air guide 160' may be formed along with the cover member 112 during the press molding process according to an aspect of the invention. However, it is understood that the guide 160' can be otherwise formed by processes which form different levels, such as the molding, casting and/or etching processes according to aspects of the invention.

When the air guide 160' is formed integrally with the cover member 112, there are no additional cost for manufacturing the air guide 160 and no additional process of attaching the air guide 160' to the bottom of the cover member 112.

As described above, the air guide provided on the cover member disperses the air flow directed toward the read/write head of the actuator, thereby alleviating the impact of air on the read/write head according to an aspect of the invention. Accordingly, the head's vibration is reduced, the accuracy of the head's tracking by servo control is increased and, consequently, the head's read/write functions are improved. While described in terms of a drive for use with a computer, it is understood that the drive could be used as a storage device in mobile entertainment products such as MP3 players, GPS units, Digital Video Recorders, and/or portable data storage devices.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hard disk drive comprising:
   a housing including a base member and a cover member;
   a spindle motor installed on the base member;
   at least one disk storing data and mounted on the spindle motor so as to be rotated by the spindle motor;
   an actuator rotatably installed on the base member and having a read and/or write head for recording data on the disk and/or reproducing the recorded data; and
   an air guide placed on a surface of the cover member, so as to protrude from the surface toward the disk near the read/write head, and to disperse an air flow caused by a rotation of the disk and directed toward the read/write head.

2. The hard disk drive of in claim 1, wherein the air guide has a triangular shape with an apex directed against the air flow to split and direct the air flow toward the spindle motor and the disk.

3. The hard disk drive of claim 1, wherein the air guide has a semicircular shape.

4. The hard disk drive of claim 1, wherein the air guide has aerodynamic shape so as to separate airflow to pass around the read/write head.

5. The hard disk drive of claim 1, wherein the air guide is attached to the bottom of the base member as a separate member.

6. The hard disk drive of claim 1, wherein the air guide is formed integrally with the cover member.

7. The hard disk drive of claim 1, wherein a distance between the air guide and the disk is in about a range of 0.3-0.5 mm.

8. The hard disk drive of claim 1, further comprising a head parking system that parks the head using a ramp loading method.

9. The hard disk drive of claim 1, further comprising a head parking system that parks the head using a (contact start up) CSS method.

10. A computer using the hard disk drive of claim 1.

11. The hard disk drive of claim 1, wherein a thickness T of the air guide is predetermined to create a distance G between the air guide and the disk, wherein
   G is sufficiently large that the air guide does not interfere with the disk during assembly of the hard disk drive, and
   G is sufficiently small such that a majority of the air flow is diverted by the air guide rather than flowing through a gap between the air guide and the disk.

12. A hard disk drive comprising:
   a housing including a base member and a cover member;
   a hard disk disposed in the housing;
   a read and/or write head for recording data on the hard disk and/or reproducing the recorded data; and
   an air guide placed on a surface of the cover member so as to protrude from the surface toward the disk near the read/write head, and to dispense an air flow caused by a rotation of the disk and directed toward the read/write head.

13. The hard disk drive as claimed of in claim 12, wherein the air guide has a triangular shape with an apex directed against the air flow to split and direct the air flow toward the spindle motor and the disk.

14. The hard disk drive of claim 12, wherein the air guide has a semicircular shape.

15. The hard disk drive of claim 12, wherein the air guide has an aerodynamic shape so as to separate airflow to pass around the read/write head.

16. The hard disk drive as claimed in of claim 12, wherein the air guide is attached to the bottom of the base member as a separate member.

* * * * *

UNITED STATES PATENT AND TRADEMARK OFFICE
CERTIFICATE OF CORRECTION

PATENT NO. : 7,474,500 B2
APPLICATION NO. : 10/939413
DATED : January 6, 2009
INVENTOR(S) : Myung-il Kim It is certified that error appears in the above-identified patent and that said Letters Patent is hereby corrected as shown below:

Title Page, Column 1 (Title), Line 1, change "HARD DISK HAVING AIR GUIDE" to --HARD DISK DRIVE HAVING AIR GUIDE--.

Column 1 (Title), Line 1, change "HARD DISK HAVING AIR GUIDE" to --HARD DISK DRIVE HAVING AIR GUIDE--.

Column 6, Line 17, change "near" to --in sufficiently close proximity to--.

Column 6, Line 18, change "head, and" to --head--.

Column 6, Line 19, change "directed toward" to --direct the air flow away from--.

Column 6, Line 21, after "of" delete "in".

Column 6, Line 31, change "base" to --cover--.

Column 6, Line 60, change "near" to --in sufficient proximity to---.

Column 6, Line 61, change "head, and" to --head--.

Column 6, Line 62, change "directed toward" to --direct the air flow away from--.

Column 6, Line 64, after "claimed" delete "of".

Column 8, Line 1, after "in" delete "of".

UNITED STATES PATENT AND TRADEMARK OFFICE
CERTIFICATE OF CORRECTION

PATENT NO.         : 7,474,500 B2
APPLICATION NO. : 10/939413
DATED              : January 6, 2009
INVENTOR(S)       : Myung-il Kim It is certified that error appears in the above-identified patent and that said Letters Patent is hereby corrected as shown below:

Column 8, Line 2, change "base" to --cover--.

Signed and Sealed this

Twenty-fourth Day of March, 2009

JOHN DOLL
*Acting Director of the United States Patent and Trademark Office*